INVENTOR:
William E. Martin
BY
Eberhard E. Wettley
Atty.

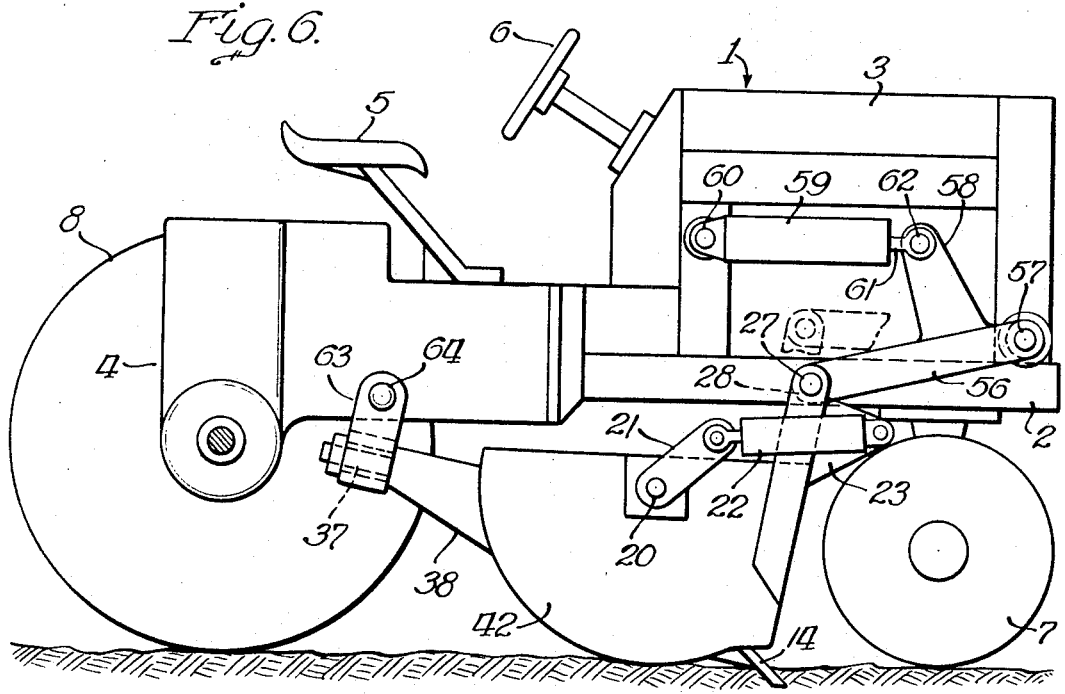

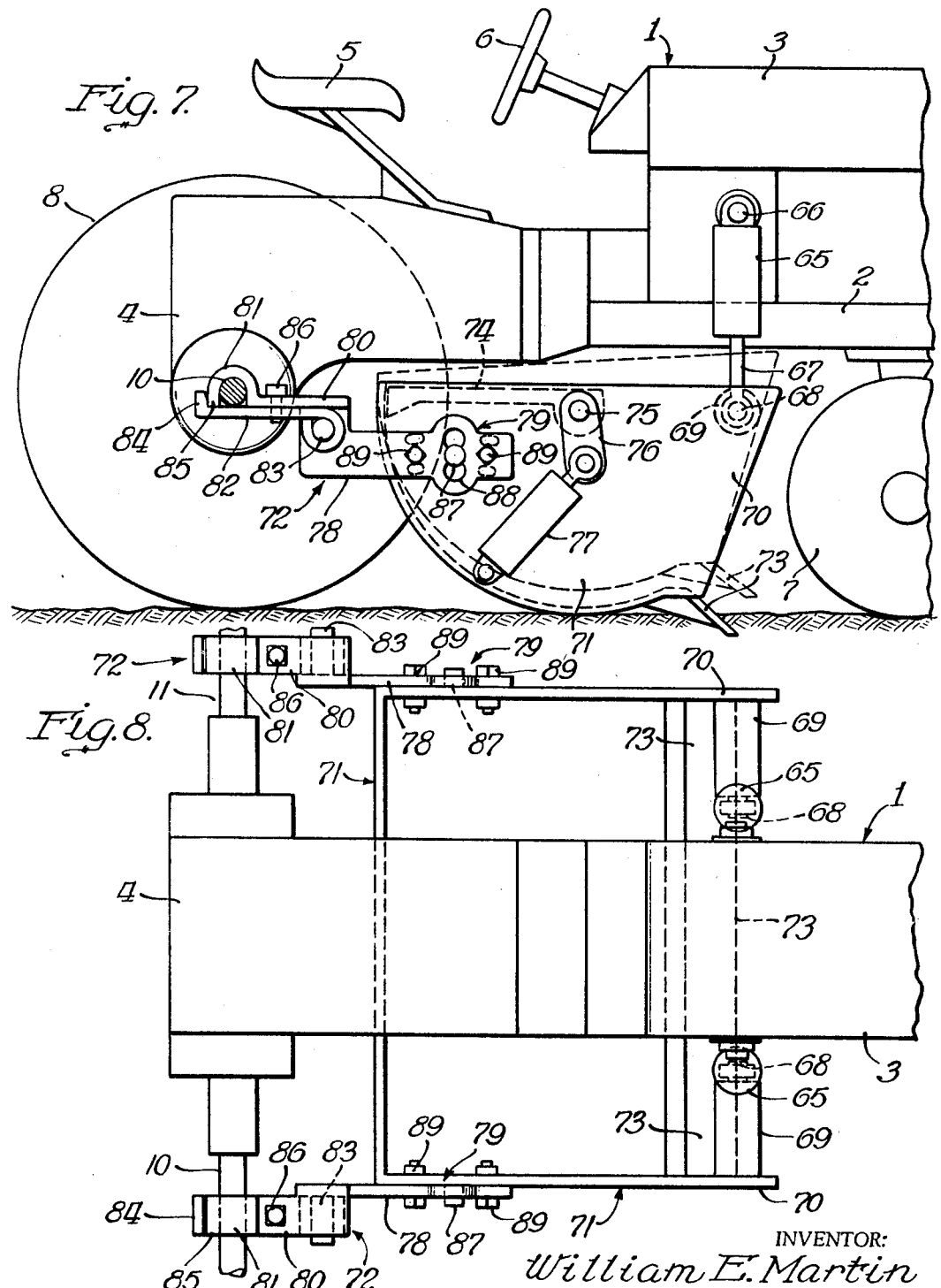

Feb. 18, 1969  W. E. MARTIN  3,427,735
SWEEP EJECTOR TYPE EARTH WORKING SCRAPER
ATTACHMENT FOR FARM TRACTORS
Filed March 7, 1966  Sheet 4 of 4

INVENTOR:
William E. Martin
BY
Eberhard E. Wedley
Atty.

United States Patent Office
3,427,735
Patented Feb. 18, 1969

1

3,427,735
SWEEP EJECTOR TYPE EARTH WORKING
SCRAPER ATTACHMENT FOR FARM
TRACTORS
William E. Martin, c/o Martin Company, P.O. Box 187,
Kewanee, Ill. 61443
Filed Mar. 7, 1966, Ser. No. 532,254
U.S. Cl. 37—126                            10 Claims
Int. Cl. E02f 3/72, 3/76

ABSTRACT OF THE DISCLOSURE

A scraper attachment for a farm type tractor or the like comprising a scraper bowl positioned between the front and rear wheels thereof, means mounting the bowl for up and down rocking movement to place the bowl blade adjacent the ground and power means to elevate and lower the bowl. The mounting means is constructed to push the scraper bowl upon forward movement of the tractor. The device further comprises adjustable stop means providing a limit for bowl movement.

This invention relates to an earth working scraper designed and constructed for attachment to a farm tractor of a conventional character whereby the tractor may be readily converted into an effective earth working facility for road building, grading, leveling or for all other uses to which a scraper assembly may be adapted.

More specifically, the earth working scraper attachment is designed with suspension mechanisms that are easily and readily connected to a farm tractor including power operated means to manipulate the scraper bowl to its normal earth working functions and to provide a scraper bowl of a shape that accommodates a sweep type of material ejector to thus evolve a compact sturdy scraper assembly that will work efficiently beneath the tractor structure and between the front and rear wheels thereof.

One of the objects of the present invention is to provide a scraper bowl of compact design incorporating a material ejector of the sweep type to discharge bowl material, which ejector is a unitary part of the bowl assembly and one that includes power means on said bowl to actuate the ejector to thereby provide a compact sturdy scraper having effective link suspension mechanisms connected with the farm tractor which are of a character to easily manipulate the bowl in a given relation to the tractor for earth working purposes and in the limited space below the tractor frame and between the front and rear tractor wheels.

Another one of the objects is to provide a scraper assembly for attachment to a farm tractor and a scraper bowl provided with fore and aft suspension means that function to raise and lower the bowl while also controlling and regulating the lateral tilt of the bowl in relation to the horizontal and to the surface over which the tractor travels.

Another object is to provide a scraper bowl attachment arrangement for connection with a farm tractor which provides three point suspension means for the bowl to enhance the flexible manipulation of the bowl in relation to the tractor through suitable power means which receive fluid under pressure from the usual tractor supply source through conventional valving means and connected by hydraulic lines of the kind associated with modern tractors.

It is another object to provide push type structures to move the bowl with the tractor including variably adjustable stop means to position the scraper bowl in a given longitudinal relation under the tractor and such structures are used in combination with freely swinging link-type suspension means to also guide the bowl and of a type that include power operated units to raise and lower the bowl under operative conditions and use.

A further object is to provide push type structures to move the bowl wherein resilient means are incorporated to allow limited fore and aft give of the bowl under operation and which resilient means are made to adjust the amount of resiliency permitted to better adapt the bowl suspension means to the area being worked by the scraper bowl or to meet any desirable bowl action to thereby enhance the cutting action of the cutting blade of the bowl.

Another object is to provide a scraper bowl having simple effective connecting means to mount the rearward portion upon the tractor axle or upon any equivalent transverse member that provides a part of the tractor or upon a readily attachable part of this kind, such connecting means being made for readily separable operation for releasable attachment and as a means that will push the bowl into the line of travel of the tractor. Such a connecting means is also made for adjustable securement with the bowl to permit variable bowl positions in attaching the connecting means to axles of different size tractors and to best use the space between the tractor wheels.

While the scraper bowls referred to hereinbefore are made for operation under the tractor frame and between the front and back wheels, it is another object to provide a scraper bowl that is axle mounted in a position behind the tractor and a bowl that is raised and lowered by actuation means that is connected with a power takeoff unit operated from the tractor power train by the operator.

A still further object is to provide a simple separable fastening arrangement for the bowl to connect the bowl with the axle for swinging motion thereabout and which arrangement provides a push or pull type of means to move such scraper bowl under forward motion by the tractor.

All other objects and advantages shall hereinafter appear in or become evident from the following detailed description of the present invention having reference to the accompanying drawings forming a part of this specification.

In the drawings:

FIG. 3 is a fragmentary detailed vertical cross sectional view through one of the coupling hanger units provided at the forward location of the bowl for support connection with the bowl raising and lowering means;

FIG. 4 is a fragmentary side elevational view of a modified structure for the rear bowl end suspension mechanism;

FIG. 5 is an enlarged fragmentary side view partially broken away and in section of the adjustable and resilient stop structure having the workable effect of nudging the bowl while pushing said bowl under operation;

FIG. 6 is another diagrammatic side elevational view of another scraper bowl arrangement using a forwardly positioned drawbar and height regulating link means together with simplified rear bowl end suspension means;

FIG. 7 is a diagrammatic side elevational view of another scraper bowl attachment assembly that hooks onto the tractor axle structure;

FIG. 8 is a fragmentary plan view of the scraper bowl construction shown in FIG. 7;

Figure 1:
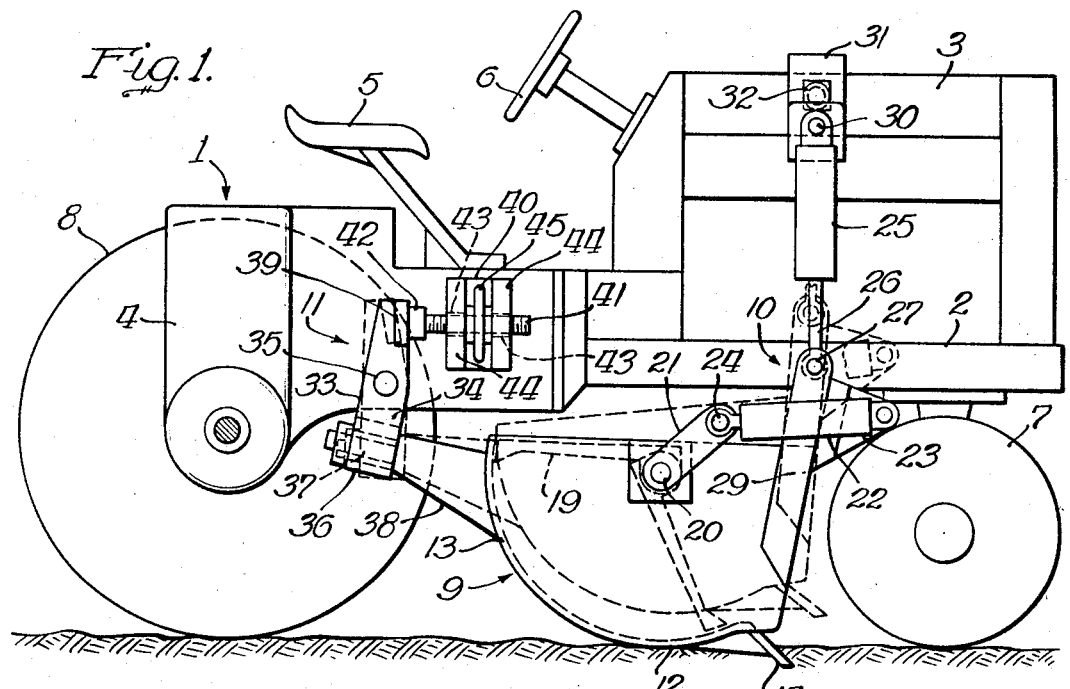
FIG. 1 is a side elevational view of a farm tractor of a general type with the near side rear wheel omitted and illustrating a scraper bowl assembly of the kind herein disclosed and comprising one form of the present invention.
Figure 2:
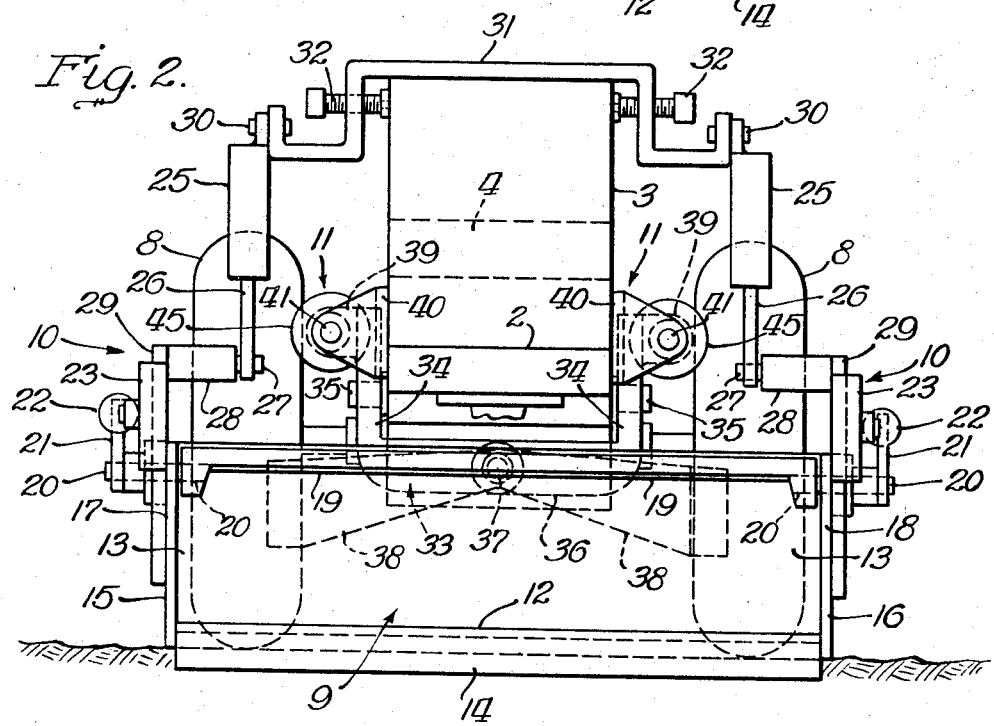
FIG. 2 is a front elevational view of the combination shown in FIG. 1 with the front tractor wheels omitted to better show the structural details of the inventive concept.

Referring now to the form of the invention that is shown in FIGS. 1 and 2, here a general view of a farm tractor 1 shows a frame 2, engine structure 3, transmission and power takeoff assembly 4, seat 5, steering wheel 6 and front and rear wheels 7 and 8 respectively. The scraper assembly comprises a bowl 9 having a front or forward suspension means 10 and a back or rearward suspension means 11 that position and suspend the bowl 9 under the tractor frame 3 and between the tractor wheels 7 and 8 as best shown in FIG. 1.

The bowl 9 has contiguous curved bottom and rear walls 12 and 13 with a forward cutting blade 14 and includes side walls 15 and 16 that extend forwardly in wings 17 and 18 to accommodate suspension means 10. In bowl 9 is provided a sweep type material ejector 19 mounted on stub shafts 20 that carry operating links or arms 21 which are actuated by means of cylinder 22 carried on bowl brackets 23 and pivotally joined at 24 with links 21. With this construction the bowl proper and the bowl ejector mechanism are compactly assembled and confined to occupy a minimum amount of space under the tractor frame and between the wheels thereof.

The forward bowl suspension means 10 are two in number but identical so that the same reference characters will be applied to identical elements of the assemblies. The means 10 comprises a swinging power cylinder 25 having its ram 26 pivotally connected with a stub shaft 27 on a bearing bracket 28 that is secured to the hanger link 29 that also carries bracket 23 and which joins the near bowl wall 15 or 16 as the case may be. Both cylinders 25 are fulcrumed on stub shafts 30 carried by an overhead bracket 31 including any suitable adjustable fastening units such as 32 for tractor attachment and orientation. The cylinders 25 are thus made freely swingable but serve to raise and lower the bowl assembly as needed between a lowered working position and a raised transportable position. Bracket 31 is also capable of adjustment in a fore and aft relation to the tractor engine structure 3 to meet various conditions of operation.

The rear bowl suspension means 11 provides a bowl push type arrangement to work the bowl and to suspend the bowl for selected rocking motion about a central longitudinal axis under the tractor and to thereby also provide a grading tilt for the bowl laterally as can be adjusted by means of the two forward suspension cylinders 25 by regulation of the hydraulic feed line fluid to such cylinders by the operator.

The suspension means 11 comprises a swingable hanger 33 having vertical legs 34 journalled on trunnions 35 mounted on the tractor transmission unit 4. The hanger has a lateral support beam 36 between the legs 34 to pivotally carry a spindle or pin 37 that is secured to and carried by the bowl frame 38 mounted on the rear wall 13 of the bowl as well shown in FIGS. 1 and 2. Each hanger leg extends upwardly above its support trunnion 35 to terminate with lateral ears 39 that point outwardly away from the tractor body part 4. A bracket 40 is attached to each side of the tractor body to support a threaded screw stem 41 that includes a head 42 placed to engage the ear 39 of the adjacent hanger structure to permit limited forward swing of the hanger and its attached bowl assembly but to establish a rearward motion limit for the hanger and its supported bowl with the front bowl end being freely swingably carried by the described suspension members 10.

Bracket 40 provides clearance guide openings 43 in dual flanges 44 for the stem 41 and a handwheel type nut 45 rides between flanges 44 to furnish adjustable means to move the stem 41 and its head 42 fore and aft of the tractor to adjust for the hanger limiting swing position of the hanger stop ears 39 under certain conditions of operation or to better accommodate the bowl position under the tractor and between the tractor wheels 7 and 8.

Thus the bowl can be made to tilt laterally about the longitudinally arranged spindle 37 as regulated by the forward twin lateral suspension means 10 and at the same time the bowl can be rocked bodily vertically about the axes of trunnions 35 with hanger 33 which is also an action that is controlled by the double acting front side cylinders 25 as directed by an operator.

To provide a means for additional flexing or give in carrying out the tilting action of the bowl, the bearing brackets 28 as seen in FIG. 3 include suitably molded resilient means 45 to confine and retain the confined end 46 of stub shaft 27 that joins with the ram 26 of cylinder 25, there being two such bracket members 28, one for each bowl side as best shown in FIG. 2.

In FIGS. 4 and 5, the suspension means 11 is like the one described in FIGS. 1 and 2 with the hanger 33 having laterally extending rearwardly set ears 47 to be contacted with the head 48 of the screw 49 that rides in guide openings 50 in flanges 51 of a bracket 52 mounted on the tractor side 4. In this particular arrangement the screw 49 is normally urged to the left as seen in FIGS. 4 and 5 by means of a spring 53 seated between the left flange 51 of bracket 52 and an adjusting stop nut 54 threaded on the screw 49, the spring 53 normally urging the screw toward ear 47 described. Maximum motion of screw 49 to the left is limited by a handwheel nut such as 55 similar to the nut provided in FIGS. 1 and 2. By adjusting the stop nut 54 on the screw 49 it is possible to increase or decrease the reactive engagement of the head 48 with the ear 47 and to thereby increase or decrease the hanger action and bowl reaction toward the rear of the tractor. With the adjustable resilient stop means shown in FIGS. 4 and 5 it is possible to obtain limited fore and aft nudging of the bowl 9 including its cutting blade 14 to enhance earth or road material penetration and forward progress of the tractor driven bowl.

In FIG. 6 the bowl 42 is provided with a drawbar link 56 connected with the stub shaft bearing unit 27 and 28 on the bowl as previously described and the front end of link 56 is carried on shaft or pin 57 mounted on the tractor in any suitable releasable fashion. A branch arm or link 58 is made apart of link 56 and a power cylinder 59 is mounted to swing on a pin such as 60 on the tractor and the ram 61 of cylinder 59 is pivotally joined at 62 with link 58. Since bowl 42 is pulled by link means 56 and by the tractor, the rear hanger structure is made as a freely swinging hanger 63 mounted on trunnions 64 to support the spindle 37 and frame unit 38 of the bowl 42. Lateral tilt of bowl 42 is here also possible by proper activation of the two side cylinders 59 (only one being shown) since the bowl is laterally rockable on the axis of the support spindle 37.

FIGS. 7 and 8 are added to show another modified arrangement of scraper assembly with simple front end suspension means each comprising a swinging cylinder 65 supported on a stub shaft 66 mounted on the tractor and the cylinder ram 67 is pivotally connected with a suitable pin or stub shaft 68 on a bracket member 69 carried by the side wing 70 of the bowl 71. The cylinder 65 is free and swingable so that the rear bowl suspension means 72 are made to push the bowl under operation and of course as guided by the vertical action of the cylinders 65 to regulate the height of the bowl and of the forward cutting blade 73 on the bowl.

The bowl includes the rotary sweeping ejector 74 on pin or shaft means 75 that are crank rotated by link 76 activated by cylinder 77 as in the previously described forms of the invention. These latter units are omitted from FIG. 8.

The rear suspension means 72 in FIGS. 7 and 8 each comprise a bracket 78 adjustably fastened at 79 to the side wall of the bowl 71 and made to provide a flange 80 terminating in a downwardly open hanger 81 that can be suspended over a transverse tractor part and as shown in this instance over the rear axle 10 of the tractor. A swingable locking plate member 82 is pivoted on a pin 83 on bracket 78 and the plate is made to close the open end of the flange hanger 81 and includes a lip 84 to prevent spread of the rear hanger wall 85 under the draft action of the tractor bowl combination. Any suitable latching means such as a bolt 86 is provided to secure the two cooperative members 81 and 82 in operative attached relation to push the bowl or to pull it on reversal of direction. The hanger 81 and locking plate 82 are such as to have suitable clearance about axle 10 to allow free swinging of the bowl 71 upon the rear axle of the tractor 1.

The adjustable fastening at 79 includes an orientation guide pin 87 on the bowl 71 positioned in one of the three openings 88 in the bracket 78 and bolts 89 fasten the bracket in place against the bowl wall. Other suitable screw openings are vertically placed to each side of the central bolt receiving openings to permit bodily upward or lowered displacement of bracket 78 or if desired angular displacement of the bracket about pin 87 to allow opposite alternate use of the bolts 89 in or through the holes so provided.

In the constructions described, the bowl assemblies were all disposed under the tractor and between the fore and aft wheels thereof to provide a scraper attachment facility for the farm tractors shown. It is to be understood that all units are of a character to receive hydraulic fluid from the pressure source that normally is part of the tractor construction and that suitable control valves and hydraulic lines are employed to connect with the power cylinders used to manipulate the scraper bowls described. In the previous forms, power cylinders were provided too for raising and lowering the bowl units.

Figure 9:
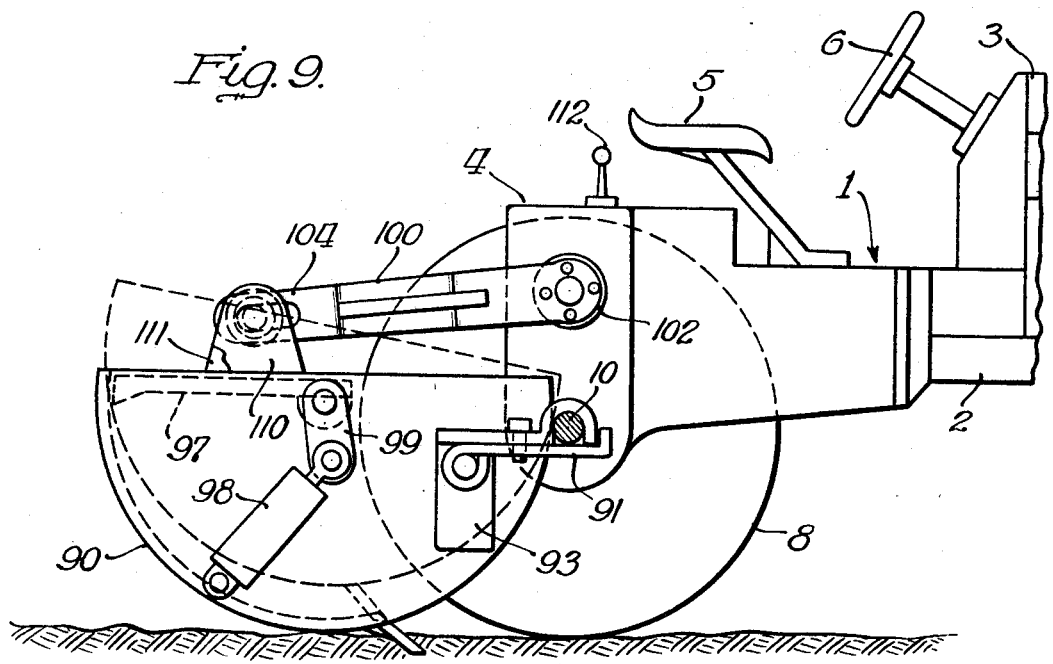
FIG. 9 is another side elevational view of a rearwardly located attachable scraper bowl assembly that is connected with the tractor axle or like means for towing the bowl behind the tractor.
Figure 10:
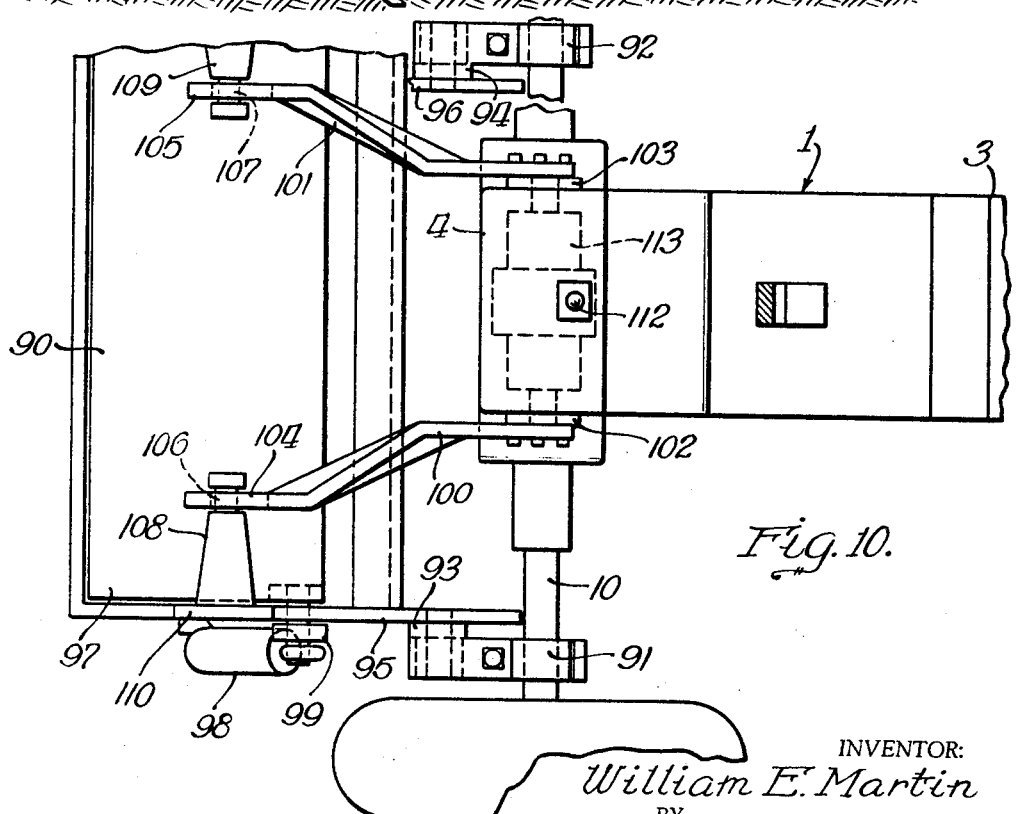
FIG. 10 is a fragmentary plan view of the construction shown in FIG. 9 to further illustrate some of the working details of this particular construction.

Referring now to FIGS. 9 and 10, this construction not only disposes the bowl of the scraper to the rear of the rear tractor axle, but a mechanism is used to raise and lower the bowl by obtaining its power from a suitable power takeoff source on the tractor transmission without the use of a hydraulic cylinder unit.

The latter construction comprises a bowl 90 rockably mounted upon the rear tractor axles 10 and 11 by separable hanger assemblies 91 and 92 that are quite similar to the securing and attaching assemblies 72 just described above in regard to the construction shown in FIGS. 7 and 8. However, in FIGS. 9 and 10 the hanger assemblies 91 and 92 are employed as drawbar mechanisms instead of push type attachments as in FIGS. 7 and 8. While not shown, adjustable means could be used with hangers 91 and 92 as in FIGS. 7 and 8 to fasten the depending plate pieces 93 and 94 to the sides 95 and 96 of bowl 90. The bowl also incorporates a sweep type ejector 97 that is operated by a bowl mounted hydraulic cylinder 98 working through the crank arm 99.

To raise and lower bowl 90, the embodiment includes swingable arms 100 and 101 that suitably attach to power takeoff units 102 and 103 of the tractor transmission 4. Arms 100 and 101 have slotted ends 104 and 105 connected with and over pins 106 and 107 on trunnion members 108 and 109 secured to the opposite side bowl walls by brackets 110 and 111.

By manipulation of a suitable valve or shift lever such as 112 for the transmission mechanism 113 (diagrammatically shown) the mechanism 113 will cause rotation of the power units 102 and 103 to swing the arms 100 and 101 according to selected requirements for raising or lowering the bowl 90 under operation and as desired.

The foregoing specification has been directed to certain preferred constructions to illustrate the present invention by way of example and not by way of limitation. Changes in the combinations shown or in the individual elements thereof are contemplated without departure from the inventive concept and the extent of such modifications shall, however, only be limited by the breadth and scope of the subject matter contained in the following claims directed to the earth working scraper bowl assemblies of this invention herein disclosed and described.

What I claim is:

1. An earth working scraper assembly constructed and arranged for operative attachment with a tractor having front and rear wheels and a rigid frame therebetween to convert said tractor into an earth woking facility and to manipulate said scraper assembly with power mechanisms receiving their power and guidance from the tractor, comprising a material handling scraper bowl having a cutting edge and being disposed beneath the frame between the front and rear wheels to load and unload material over the cutting edge of the bowl, said bowl comprising a rearwardly directed extension thereon, bowl support mechanism for said bowl pivotally mounted for rocking upon a tractor part to cradle rock the bowl about an axis transversely related to the tractor, said support mechanism comprising a hanger, swingably mounted on said tractor, constructed and arranged to provide a rearward limit of movement for said bowl and to push said bowl upon forward movement of said tractor, pivotal coupling means connecting said hanger and said bowl extension for allowing movement of said bowl about an axis generally longitudinal with respect to said tractor, and power means swingably suspended from the tractor at each side thereof and connected with lateral structural portions of said bowl spaced away from the location of the support mechanism to regulate the height of the bowl, said power means providing bowl height and position control means for the bowl in relation to the ground under the tractor without pushing said bowl upon forward movement of said tractor.

2. In the combination set forth and defined in claim 1 with the addition of stop means mounted on the tractor for engagement with said hanger to limit the rocking motion thereof under bowl reaction during the material function thereof while said bowl is height regulated by said power means for operative material loading or for material transport.

3. In the combination of claim 2 wherein said stop means comprises an adjustable member having an abutment part positioned to contact said swingable hanger to limit the motion of the hanger and the attached bowl in a rearward direction along the line of tractor travel to cause the hanger to push said bowl under operation.

4. In the combination of claim 3 wherein said stop means comprises a bracket having a movable stop member disposed to engage the hanger upon predetermined hanger motion, and spring means are connected with said stop member to allow limited give of said stop member upon hanger contact therewith under bowl reaction during material loading to induce a permissible bowl nudging action under operaitve bowl loading positions.

5. In the combination set forth and defined in claim 4 with the addition of adjustable means connected with the stop member to change the effective hanger contact with the stop member and with further adjustable means connected with the spring means to regulate the effective working tension of said last means to absorb the bowl reactionary motion and to vary the effective nudging action of the bowl by said spring means.

6. In the combination set forth and defined in claim 1 wherein the power means includes operable connections with the lateral structural portions of the bowl comprising pivotal bearing structures having resiliently connected coupling elements to provide flexing action of the bowl with respect to the swingable power means as the latter operatively raise, lower or tilt the bowl under operative conditions.

7. In the combination set forth and defined in claim 1 wherein said scraper bowl is constructed with contiguous bottom and rear walls to described and follow a portion of a circle between the side walls of the bowl, and said bowl includes an internally wholly confined ejector blade pivotally mounted on the bowl walls to sweep through the confines of the bowl with the terminal blade end following the arc of the bottom and rear bowl walls, said bowl wholly supporting power means that connect with the ejector blade to swing the blade about the blade mountings on said bowl to provide a compact self emptying and cleaning bowl construction devoid of large projecting ejector blade operating devices.

8. In the combination set forth and defined in claim 1, wherein said support mechanism comprises a bracket structure connected with a transverse member of said tractor to bodily and swingably suspend the bowl relatively to the tractor and to provide an actuation means to move said bowl directly with the motion of the tractor, said power means coacting with said bracket structure to raise and lower the bowl for material handling purposes.

9. In the combination set forth and defined in claim 8, wherein said bracket structure includes releasable separable coacting attachment elements that fit over the transverse tractor member together with releasable securing means to hold said elements on the tractor member or to release such elements therefrom.

10. An earth working scraper assembly constructed and arranged for operative attachment with a tractor to convert said tractor into an earth working facility and to manipulate said scraper assembly with power mechanisms receiving their power and guidance from the tractor, comprising a material handling scrape bowl having a cutting edge over which material is loaded and unloaded, said bowl having an extension thereon;

bowl support mechanism for said bowl pivotally mounted for rocking upon a tractor part to cradle rock the bowl about an axis transversely related to the tractor, said support mechanism comprising a bracket coupled with the bowl extension;

a swingable hanger operatively connected to the bracket and pivoted upon the tractor part;

power means swingably suspended from the tractor at each side thereof and connected with lateral structural portions of said bowl spaced away from the location of the support mechanism to regulate the height of the bowl, said power means providing bowl height and position control means for the bowl in relation to the ground under the tractor; and adjustable stop means mounted on the tractor and having an abutment part engageable with said swingable hanger to limit both the pivotal movement of the hanger and the extent of downward movement of the bowl which can be provided by the power means.

References Cited

UNITED STATES PATENTS

| | | | |
|---|---|---|---|
| 2,263,120 | 11/1941 | Cox | 37—126 |
| 2,517,163 | 8/1950 | Arps | 37—126 |
| 2,587,869 | 3/1952 | Marshall | 37—124 |
| 2,597,692 | 5/1952 | Wills et al. | 37—126 |
| 2,634,516 | 4/1953 | Morkoski et al. | 37—126 |
| 2,841,898 | 7/1958 | Sampson | 37—117.5 XR |
| 2,883,776 | 4/1959 | Orscheln | 37—144 XR |
| 3,138,883 | 6/1964 | Elenburg | 37—124 |
| 3,272,122 | 9/1966 | Behringer | 101—426 |
| 3,300,882 | 1/1967 | Fryer | 37—129 |
| 3,343,286 | 9/1967 | Ray et al. | 37—129 XR |

EDGAR S. BURR, *Primary Examiner.*

U.S. Cl. X.R.

37—117.5